US005769107A

United States Patent [19]

Woodruff

[11] Patent Number: 5,769,107

[45] Date of Patent: Jun. 23, 1998

[54] VALVE SYSTEM, PARTICULARLY FOR USE WITH TERMITICIDE SYSTEMS

[75] Inventor: Keith F. Woodruff, Mountainside, N.J.

[73] Assignee: American Cyanamid Company, Madison, N.J.

[21] Appl. No.: 624,977

[22] Filed: Mar. 28, 1996

[51] Int. Cl.[6] .......... F16L 37/28

[52] U.S. Cl. .......... 137/1; 251/149.2

[58] Field of Search .......... 251/149.1, 149.2, 251/149.8, 284; 137/1

[56] References Cited

U.S. PATENT DOCUMENTS

| | | | |
|---|---|---|---|
| 1,984,375 | 12/1934 | Johnston | 251/284 X |
| 2,406,662 | 8/1946 | Burchett | 251/149.2 X |
| 4,387,879 | 6/1983 | Tauschinski | 251/149.1 |
| 5,102,395 | 4/1992 | Cheer et al. | 251/149.1 X |
| 5,141,498 | 8/1992 | Christian | 251/149.1 X |
| 5,213,309 | 5/1993 | Makishima | 251/149.1 X |
| 5,269,763 | 12/1993 | Boehmer et al. | 251/149.1 X |
| 5,269,771 | 12/1993 | Thomas et al. | 251/149.1 X |
| 5,329,726 | 7/1994 | Thorne et al. . | |
| 5,542,582 | 8/1996 | Ligon et al. | 251/149.2 X |

*Primary Examiner*—Kevin Lee

*Attorney, Agent, or Firm*—Charles F. Costello, Jr.; Mark P. Stone

[57] ABSTRACT

A split clam shell valve for flow and metering of powder, semi-viscous, and granular materials includes a resilient slitted cover over a discharge outlet in an outer valve component. The valve is driven into an open position by the action of an inner valve component received within the outer valve component and movable relative to the cover for applying a force which opens the slitted cover. An elastic band engaging the cover, cooperating with the resilient material forming the cover, seals the slit to automatically close the valve when the force applied to the cover by the inner valve component is removed. The valve is particularly useful for automatically refilling containers with semi-viscous, powder and granular material to the same level in repeatable operating sequence.

21 Claims, 2 Drawing Sheets

VALVE SYSTEM, PARTICULARLY FOR USE WITH TERMITICIDE SYSTEMS

BACKGROUND OF THE INVENTION

The present invention is directed generally to improvements to valve means, and in particular split clam shell flow and metering valves, particularly useful in connection with controlling the flow of powders, granular material, and semi-viscous material. The improved valve system may advantageously be employed for refilling containers used in in-ground termiticide systems, such as those disclosed by U.S. Pat. No. 5,329,726.

Pending U.S. patent application Ser. No. 08/480,579, filed on Jun. 7, 1995 and entitled "Termiticide Bait Tube For In Ground Application" discloses a device in which an outer housing is implanted into the ground, and an inner housing containing termiticide product is received within the outer housing. When the termiticide in the inner housing is depleted, the inner housing is removed and replaced with a completely new container loaded with termiticide product. The complete replacement of an extended product container with a substitute loaded container is both time consuming and extensive.

It is a primary object of the present invention to provide improved valve means for dispensing granular, powder or semi-viscous product from a supply container. It is a further object of the present invention to provide improved valve means for automatically and repeatedly refilling a container to the same refill level, and in particular for refilling depleted in-ground termiticide tubes, without removing and replacing depleted tubes. It is yet another object of the present invention to provide improved valve means which switch from an opened position to a closed position by the resilient action of a cover over a discharge outlet. It is another object of the invention to provide valve means, which when used to refill a container, automatically switch into a closed position when the valve is withdrawn from the container being refilled. It is still a further object of the present invention to provide improved valve means which is simple and economical to operate and manufacture.

Other objects, improvements and advantages of the present invention will become apparent from the following description.

SUMMARY OF THE INVENTION

In accordance with a first aspect of the present invention, improved valve means includes a slitted cover mounted over a discharge outlet and formed from a resilient material partitioned into a plurality of adjacent resilient sections, and a plunger element operatively associated therewith for selectively separating the sections to open the valve when a driving force is exerted on the cover by the plunger. When the driving force of the plunger is released, the adjacent sections of the cover automatically return to a contiguously abutting relationship to close the slit and therefore close the valve as a result of the return force of the resilient material from which the cover is formed. Supplemental resilient means, as for example, an elastic band or O-ring operatively associated with the cover, supplements the resilient return force applied to the sections of the cover for sealing the slitted cover closed. The combined resilient action of the cover and the supplemental resilient means drives the plunger element in a direction away from the cover when the driving force applied to the plunger element is released. Means are provided for retaining the supplemental resilient element engaged on the slitted cap for applying the supplemental resilient force thereto.

The plunger element comprises a first valve inner component received within a second outer valve component. The discharge outlet is defined at one end of the outer valve component, and the slitted cover is mounted thereon. The inner valve component is selectively movable relative to the outer valve component for applying the driving force to the cover to separate the resilient sections thereof to open the valve.

Means are provided for removably mounting the valve to a discharge outlet of a supply container for controlling and metering the flow of product from the supply container. The valve further includes means for engaging a container to be refilled from the supply container. During a refilling procedure, a flange on the forward end of the valve engages the opened top of the container to be refilled, and the opposed end of the valve is coupled to the supply container. The supply container is depressed downwardly, driving the plunger element of the valve in a direction which will separate the slitted sections of the resilient cover. Material from the supply container flows through the opened slits between the separated sections of the cover by gravity feed, and into the container to be refilled. The flow of material continues until the product level in the container being refilled reaches the cover of the valve, at which time the product in the container blocks any further downward flow of material. As the supply container is removed from the refilled container, the force applied to the plunger element of the valve is released, and the resilient action of the cover and the supplemental resilient element close the opened slits in the cover to automatically close the valve. The lower container is therefore automatically refilled in repeatable operations to the same level, and the valve removably mounted to the supply container automatically closes as the valve and supply container are withdrawn conjointly from the lower container.

Although the improved valve system of the present invention is particularly adapted for use in connection with the refilling of in-ground termiticide tubes, it is useful for numerous other applications requiring control of flow and metering of numerous other products including powders, granular materials and semi-viscous material.

DESCRIPTION OF THE BEST MODES FOR CARRYING OUT THE INVENTION

Figure 2A:
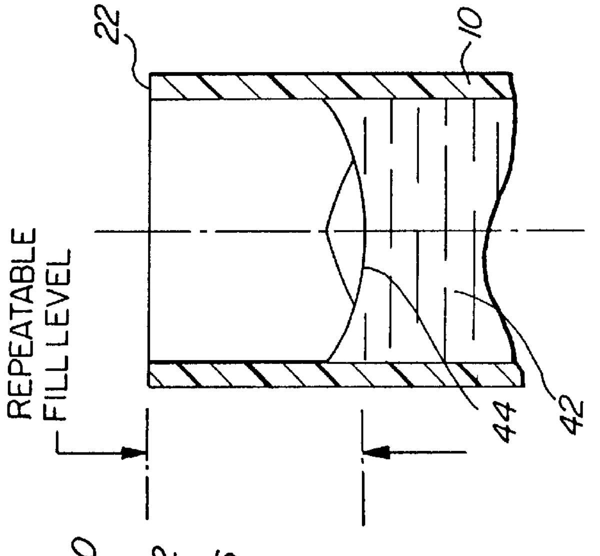
FIG. 2A schematically illustrates a repeatable fill level of the receptable container by the valve device as illustrated by FIG. 2.

The improved valve system in accordance with the present invention will now be discussed in greater detail with reference to FIGS. 1–5 of the drawing.

Figure 1:
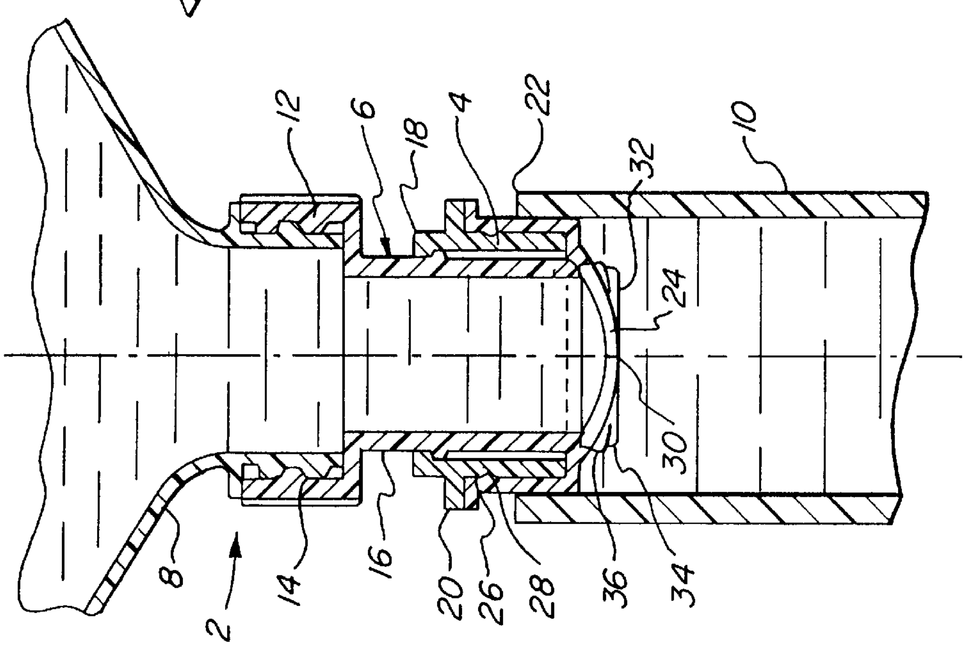
FIG. 1 of the drawing illustrates a side elevational view, in section, of a valve device in accordance with the present invention, in which an inlet end of the valve is mounted to a product container and an outlet end of the valve is received in a receptable container.

Referring first to FIG. 1, a valve in accordance with the presently preferred embodiment of the invention is generally designated by the reference numeral 2. The valve includes an outer valve component or bushing designated by reference numeral 4, and an inner valve component or plunger designated by reference numeral 6. As will be discussed herein, the inner valve component is movable relative to the outer valve component to selectively open and close the valve.

The inner valve component 6 includes a larger diameter hollow head portion 12 defining an inlet opening of the valve 2, which merges into a narrower diameter hollow stem portion 16 extending from the head portion 12. The hollow head and stem portion define a continuous passageway through the inner valve component for material entering the inlet opening thereof.

The head portion of the inner valve component 6 is threaded by threads 14 defined on a portion of an inner surface thereof for removably receiving the outlet or discharge nozzle of a product supply container designated by the reference numeral 8. The outer surface of the nozzle of the container 8 includes complementary threads so that the product container 8 is removably mounted to the hollow head portion 12 of the inner valve component 6. As illustrated by FIG. 1, the product container 8 is oriented downwardly relative to the valve 2 so that material flows downwardly by gravity feed through the discharge nozzle of the product container and into the inlet opening of the valve defined by the hollow head portion 12 of the outer valve component 4.

The hollow outer valve component is illustrated in the drawing in the configuration of a generally cylindrical body. A peripheral flange 20 extends around a portion of the outer surface of the outer valve component. The stem portion 16 of the inner valve component 6 is snap-fitted within the hollow cylindrical body of the outer valve component 4, and is retained therein by a retaining ring 18 defined around a portion of the outer stem 16, and corresponding inwardly directed engagement means (as, for example, an inner rim) defined proximate to the top of the outer valve component 4. The retaining ring effectively acts as a stop to limit the maximum longitudinal displacement of the inner valve component relative to the outer valve component in a direction of movement of the inner valve component away from the discharge outlet of the valve 2, as will be discussed in greater detail below. Preferably, the outer valve component 4 and the inner valve component 6 are each formed from a strong and durable material, as for example, molded plastic.

Still referring to FIG. 1 of the drawing, the lower portion of the valve 2 is removably received within a receptacle 10. The receptacle 10 includes a top edge or rim 22 on which the flange 20, extending from the outer surface of the outer valve component 4, can be seated (See also FIG. 2 of the drawing). When the flange 20 is seated on the top edge 22 of the receptacle 10, the lower portion of the valve 2 is received within the inner portion of the receptacle 10. A resilient cover 24, preferably formed from rubber, is dome-shaped and mounted across the bottom of the outer valve component 4 to seal and close the lower end or discharge outlet of the valve 2. The cover 24 includes a sidewall portion thereof which extends up and around the outer surface of the outer valve component 4. The sidewall portion of the cover 24 is mounted to the outer surface of the outer valve component 4 by cooperation between a retaining groove 26 defined on the outer surface of the outer valve component and a complementary mating bead 28 formed on the inner surface of the sidewall of the cover 24 received in the groove 26 to retain the cover 24 mounted to the outer valve component 4 for sealing the discharge outlet at the lower end thereof.

The bottom surface of the cover 24 is slitted. In the preferred embodiment of the invention, four slits 30 are oriented perpendicular to each other to define equal quadrants or sections of resilient material on the bottom surface of the resilient cover 24. In the preferred embodiment of the invention, four ribs 32 extend from the lower surface of the cover 24, each of the ribs bisecting one of the quadrants defined between adjacent slits, each adjacent rib being equidistantly spaced from the next adjacent rib. Each rib 32 defines a recessed area or notch 34 at the peripheral lower end thereof. An elastic band or O-ring 36 is received within the recesses defined on each rib so that the O-ring is retained on the lower surface of the cover 24, proximate to the periphery of the cover 24, by the retaining ribs 32. Each rib 32 is radially oriented and extends from the approximate center of the lower surface of the cover 24 substantially to the periphery thereof. The O-ring 36 is provided to seal the slits 30 in the cover 24 when the valve is in a closed position, as illustrated by FIG. 1. The O-ring also provides a resilient force, supplementing the resilient force of the cover 24, to drive the inner valve component 6 in a direction away from the cover 24 when the valve is switched from an opened to a closed position, as will be discussed below.

Figure 2:
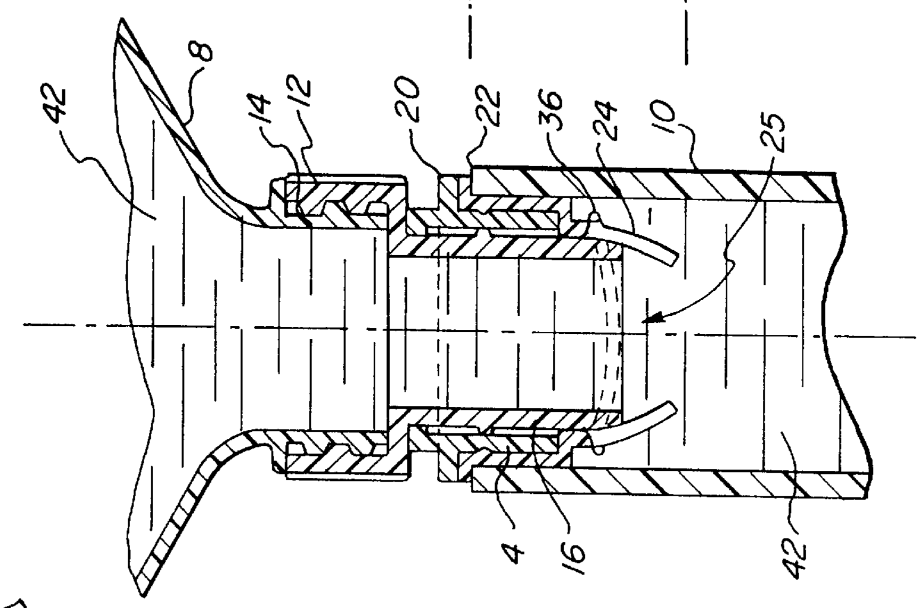
FIG. 2 is a side elevational view, in section, of the valve device illustrated by FIG. 1, in which the outlet end of the valve is opened for discharging material from the product container into the receptacle container.

FIG. 2 illustrates the valve 2 of FIG. 1, in its opened position. The same reference numerals have been used in FIG. 2 to designate elements which correspond to those illustrated in FIG. 1. In FIG. 2, the flange 20 extending from the outer surface of the outer valve component 4 is seated on the top edge 22 of the receptacle 10. The product supply container 8 holding a product designated as reference numeral 42, which is preferably a granular, powder, or semi-viscous material, is removably mounted to the head portion 12 of the inner valve component 6, in the manner previously described herein. The container 8 is oriented downwardly so that the product 42 therein flows downwardly by gravity feed into the hollow head portion 14 and through the hollow stem portion 16 of the inner valve component. A downward force is applied to the container 8 so that the discharge nozzle thereof received within the head portion of the inner valve component 6 drives the inner valve component downwardly relative to the outer valve component 4. The outer valve component, which is seated on the upper edge 22 of the receptacle 10 by flange 20, remains fixed or stationary relative to the downward movement therein of the inner valve component.

The force applied downwardly on the inner valve component 6 drives the lower edge of the stem portion 16 into engagement with the slitted, resilient lower surface of the cover 24 extending over the discharge outlet defined at the bottom of the outer valve component 4. As a result of the force applied to the cover 24, the resilient quadrants of the cover defined between the slits 30 are caused to separate from each other, opening the bottom surface of the cover 24. Product from the container 8 flows downwardly through the hollow head and stem portions of the inner valve component 6, and into the lower receptacle 10 through the now opened discharge outlet designated by reference numeral 25. FIG. 2 illustrates the lower surface of the cover 24 in an opened position as a result of the downward relative movement of the stem portion 16 of the inner valve component 6. When the valve is in its opened position, the lower end of the stem 16 engages the inner surface of the resilient cover 24 to maintain the discharge outlet 25, defined between the separated resilient slitted segments of the cover, opened to permit flow of material into the lower receptacle 10.

Product will flow from the supply container 8, through the valve 2 and into the receptacle 10 until the receptacle is filled to a predetermined level. The predetermined level corresponds essentially to the distance that the lower surface of the cover 24 is received within the receptacle 10. After the receptacle 10 has been filled to this level with the product 42, there is no additional volume in the receptacle to receive any more product even though the discharge outlet 25 remains open, and further flow of product from the valve into the receptacle automatically ceases. The product container, which is still coupled to the valve 2, is moved upwardly relative to the receptacle, thereby withdrawing the valve from within the receptacle. The flange 20 is unseated from the top edge of the receptacle, and the downwardly applied force on the inner valve component 6 is removed. The release of the downwardly applied force enables the resilient return force of the slitted lower surface of the cover 24 to dominate, thereby returning the separated segments of the cover 24 to the closed position as illustrated by FIG. 1. The return of the cover 24 to its closed position is aided by the resilient force applied to the lower surface of the cover by the elastic band 36 retained thereon. The supplemental resilient force applied by the elastic band also serves to seal the slitted bottom surface of the cover 24 by maintaining the adjacent separated slitted segments of the cover in firmly abutting, contiguous engagement.

As the cover 24 returns to its closed position as a result of the resilient return force acting thereon, the cover 24 (aided by the elastic band 36) applies an upwardly directed force to the bottom of the stem of the inner valve component, causing it to move relative to the outer valve component in a direction away from the discharge outlet 25. The inner valve component continues to move under the urging of the return resilient force of the cover 24, until further relative movement is prevented by the retaining ring 18 which, as previously discussed, acts as stop means. The inner valve component is maintained in this maximum displaced distance from the discharge outlet as a result of the resilient return force of the cover which is continuously applied thereto, until the return force is superseded by a force applied in the opposite direction to open the valve, as previously discussed. Accordingly, the inner valve component 6 is returned to its closed valve position relative to the outer valve component 4, illustrated by FIG. 1, automatically when the valve 2 is unseated from the receptacle 10 as the product container 8 is raised relative to the receptacle.

The receptacle 10 will be automatically repeatably filled to the same predetermined level as a result of the action of the valve 2 as described with respect to FIG. 2. Since the valve automatically closes simultaneously with the withdrawal thereof from the receptacle 10 after the predetermined fill level has been achieved, no additional material is deposited into the receptacle 10 as the valve is withdrawn therefrom.

FIG. 2A illustrates the top portion of the receptacle 10 after the valve 2 has been withdraw therefrom. Reference numeral 44 illustrates the predetermined, repeatable level to which the container 10 has been filled (or re-filled) with product 42. As discussed, this level corresponds to the distance that the cover 24 extends into the receptacle when the flange 20 of the outer valve component is seated on the top edge 22 of the receptacle 10 (See FIG. 2). As also illustrated by FIG. 2A, the fill level 44 is contoured to complement the dome-shaped configuration of the bottom of the cover 24 when the cover is in its closed position (See FIG. 1).

Figure 3:
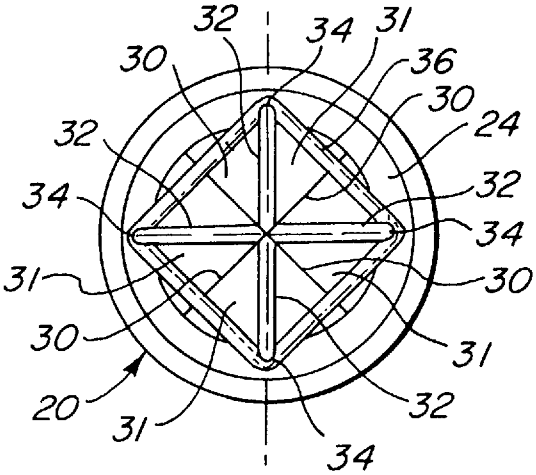
FIG. 3 illustrates a bottom plan view of the valve device of FIG. 1 showing a slitted cover mounted over the discharge out let of the valve.

FIG. 3 of the drawing illustrates a bottom plan view of the valve 2 in the closed position as shown in FIG. 1. The resilient cover 24 is cut by four perpendicularly oriented slits 30 defining four equal quadrants 31 of resilient material. Each of the quadrants 31 is bisected by a rib 32, which extends radially from the center of the cover 24 proximate to the outer periphery thereof. The peripheral end of each rib 32 defines a excessed portion 34. The elastic band, such as the O-ring 36, extends around the four ribs 32, and is retained thereon by engagement with the recessed portion 34 defined on the outer end of each rib 32.

Although the preferred embodiment of the invention illustrates that the bottom surface of the cover 24 is slitted into four equal sections or quadrants and that each of the quadrants is bisected by a radially extending rib, other configurations and arrangements of the slitted cover and ribs are within the scope of the present invention. The the number of slits, quadrants and ribs, and the relative arrangement thereof, can be varied from that shown in the drawings.

Figure 4:
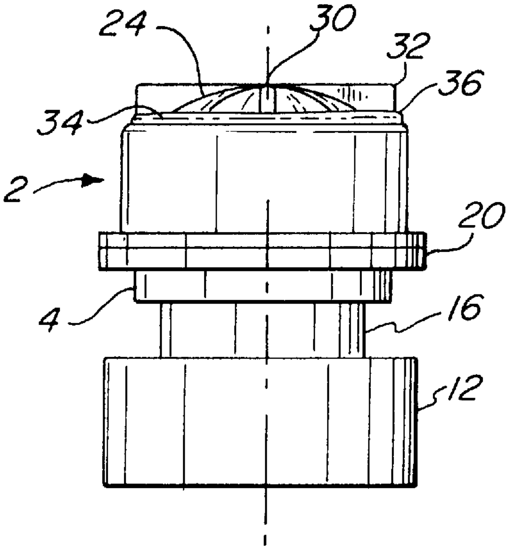
FIG. 4 illustrates a side elevational view of the valve device illustrated by FIGS. 1 and 2 showing the valve device removed from the product container and the receptacle container.

FIG. 4 of the drawing illustrates a side elevational view of the valve 2 shown in FIG. 1 uncoupled from the upper product container 8 and removed from the lower receptacle 10. The head portion 12 and the stem portion 16 of the inner valve element 6 are shown in the retracted position relative to the outer valve, and the valve 2 is in its closed position. The slit 30 is sealed as a result of the unopposed resilient return force of the material from which the cover 24 is formed, also aided by the resilient force of the elastic band 36. The ribs 32 extend radially outwardly from the center of the lower surface of the cover 24 substantially to the periphery thereof, and the elastic band 36 is retained around the ribs 32 by the recessed portion 34 defined at the bottom of the remote end of each rib.

Figure 5:
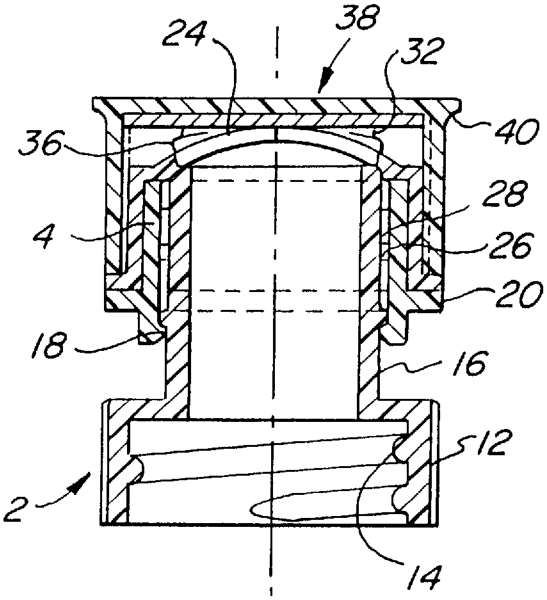
FIG. 5 illustrates a side elevational view of the valve device of FIG. 4, in section, showing a removable cover mounted to the discharge outlet end of the valve.

FIG. 5 of the drawing is similar to FIG. 4, and illustrates the valve 2, partially in section, and a cap 38 removably mounted to the discharge end of the valve. The wider diameter head portion 12 of the inner valve component 6 is internally threaded by threads 14 to removably receive therein the discharge nozzle of the product container 8 (see FIGS. 1 and 2). The stem portion 16 of the inner valve component 6, which is reduced in diameter relative to the head portion 12, extends from the head portion towards the discharge end of the valve defined by the bottom surface of resilient cover 24. As previously discussed herein, the cover 24 further defines a sidewall which extends around the outer surface of the outer valve component 4, and is retained thereon by a retaining groove 26 and a complementary mating bead 28. The flange 20 extending from the outer surface of the outer valve portion 4, and the ring 18 for retaining the inner valve component within the outer valve component and limiting relative movement thereof, are also illustrated by FIG. 5.

The cap 38 removably mounted over the bottom of the cover 24, includes a sidewall which extends around the outer surface of the outer valve component 4, and is seated on the flange 20. The top surface of the cap 38 defines a flange or rim 40 to enable a user to readily remove the cap from the valve. The cap is provided to cover and protect the discharge outlet of the valve and maintain the slitted cover 24 in a closed position when the valve is not in operation. Accordingly, a product container 8 may be stored with the valve 2 mounted to the discharge nozzle of the container, and the cap 38 mounted over the discharge outlet of the valve assures that product will not be inadvertently discharged from the container through the valve.

The valve system described herein is particularly useful in connection with flow and metering of powders, granular material, and semi-viscous material. It is also useful in connection with refilling in-ground termiticide tubes of the type employed in termite monitoring and detection systems exemplified by the aforementioned prior art references. The valve system of the present invention advantageously enables the same receptacle to be automatically and repeatedly refilled to the same product level during each filling and refilling operation, and the valve automatically closes simultaneously with the withdrawal thereof from the receptacle after it has been re-filled. The valve system of the present invention is also applicable to other operations and procedures requiring flow control and/or metering of materials, and in particular, powders, granular materials and semi-viscous materials, as will be known to those skilled in the art.

Other modifications and advantages of the valve system of the present invention will be apparent to those skilled in the art. Accordingly, the description of the preferred embodiment of the invention herein is intended to be illustrative only and not restrictive of the scope of the invention, that scope being defined by the following claims and all equivalents thereto.

I claim:

1. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve device being in a closed position when said cover is substantially sealed, said cover being mounted to and extending over at least a portion of an outer surface of said outer valve component, said inner valve component being selectively movable towards said cover over said discharge outlet of said outer valve component for applying said opposing force thereon to separate said adjacent segments of said cover to open said valve device, said inner valve component defining a forward end thereof at an end of said inner valve component closest to said discharge outlet of said outer valve component, said inner valve component defining an opening therein substantially planar with said forward end thereof.

2. The valve device as claimed in claim 1 wherein said inner valve component has a head portion and a stem portion extending therefrom, said head portion being larger in cross section than said stem portion.

3. The valve device as claimed in claim 2 wherein said head portion and said stem portion of said inner valve component are hollow.

4. The valve device as claimed in claim 3 wherein said head portion of said inner valve component includes means for removably coupling said head portion to a discharge nozzle of a product container.

5. The valve device as claimed in claim 1 including stop means for limiting the maximum relative displacement of said inner valve component to said outer valve component.

6. The valve as claimed in claim 1, further comprising:

stop means for limiting the maximum relative displacement of said inner valve component to said outer valve component, said stop means including a retaining ring around an outer surface of said inner valve component, and cooperating means on an inner surface of said outer valve component for engaging said retaining ring.

7. The valve device as claimed in claim 1 wherein said inner valve component received within said outer valve component includes a head portion and a stem portion extending therefrom, said head portion being larger in section than said stem portion, said inner valve component being received within said outer valve component such that said stem portion of said inner valve component is oriented proximate to said discharge outlet in said outer valve component, and said head portion of said inner valve component is oriented remote from said discharge outlet of said outer valve component.

8. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve device being in a closed position when said cover is substantially sealed, said cover being mounted to and extending over at least a portion of an outer surface of said valve component, said inner valve components being selectively movable towards said cover over said discharge outlet of said outer valve component for applying said opposing force thereon to separate said adjacent segments of said cover to open said valve device, said cover being slitted to form said plurality of segments.

9. The valve device as claimed in claim 8 wherein said cover defines intersecting slits forming said adjacent segments as four equal quadrants.

10. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve being in a closed position when said cover is substantially sealed, said inner valve component being selectively movable towards said cover over said discharge outlet of said outer valve component for applying said opposing force thereon to separate said adjacent segments of said cover to open said valve, said valve device further including an elastic band mounted to said cover to exert a force on said cover in a direction to close said cover.

11. The valve device as claimed in claim 10 further including at least one rib on said cover for retaining said elastic band on said cover.

12. The valve device as claimed in claim 11 wherein said at least one rib defines a recessed portion thereon for retaining said elastic band therein.

13. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve device being in a closed position when said cover is substantially sealed, said cover being mounted to and extending over at least a portion of an outer surface of said valve component.

said inner valve components being selectively movable towards said cover over said discharge outlet of said outer valve component for applying said opposing force thereon to separate said adjacent segments of said cover to open said valve device, said outer valve component including a hollow body portion and a peripheral flange extending from the outer surface thereof, said peripheral flange extending from said outer surface of said outer valve component is adapted to being seated on an upper rim of a receptacle container.

14. The valve device as claimed in claim 13 further including means for mounting said cover over said discharge outlet defined by said outer valve component around a portion of the outer surface of said hollow body portion of said outer valve component.

15. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve device being in a closed position when said cover is substantially sealed, said inner valve component being selectively movable towards said cover over said discharge outlet of said outer valve component for applying said opposing force thereon to separate said adjacent segments of said cover to open said valve device, said outer valve component including a hollow body portion and a peripheral flange extending from an outer surface of said hollow body portion, said valve device further including a cap removably mounted over said discharge outlet of said outer valve component, said cap being retained on said hollow body portion of said outer valve component.

16. A valve device comprising:

a first valve component defining a discharge outlet at one end thereof, a second valve component movable relative to said discharge outlet of said first valve component, said second valve component defining a forward end thereof at an end of said second valve component closest to said discharge outlet of said first valve component, said second valve component defining an opening therein substantially planar with said forward end thereof;

a cover formed from resilient material mounted over said discharge outlet of said first valve component, said cover comprising a plurality of separate, adjacent resilient segments, said cover being closed by the resilient force of said adjacent segments thereof when no opposed force is applied thereto, said cover being mounted to and extending over at least a portion of the outer surface of said first valve component, said second valve component being selectively movable relative towards said cover over said discharge outlet of said first valve component to apply said opposing force thereon to separate said plurality of adjacent segments to open said valve, said second valve component being movable away from said cover over said discharge outlet by the resilient force of said adjacent segments of said cover when said opposing force applied to said cover is removed, said valve being switched from a closed position to an open position by moving said second valve component relative to said first valve component, and said valve is switched from its opened position to said closed position by the resilient return force of said cover acting on said second valve component.

17. A method of opening and closing a valve device, said method including the steps of:

mounting a first valve component for movement relative to a second valve component, mounting a cover over a discharge outlet defined in said second valve component, said cover extending over and being mounted to at least a portion of the outer surface of said second valve component, moving said first valve component relative to said cover on said discharge outlet defined in said second valve component, said cover being formed in part from a resilient material and defining a plurality of resilient adjacent cover segments in contiguous relationship, applying a force on said cover by said first valve component for separating at least two of said adjacent cover segments, defining an opening in the end of said first valve component closest to said discharge outlet of said second valve component, said opening in said first valve component being defined substantially planar with the forward end thereof, and removing said applied force to permit said plurality of cover segments to return to said contiguous relationship and for moving said first valve component in a direction relative to said second valve component away from said cover by the resilient return force of said cover.

18. A method of opening and closing a valve device, said method including the steps of:

mounting a first valve component for movement relative to a second valve component, moving said first valve component relative to a cover on a discharge outlet defined in said second valve component, said cover being formed in part from a resilient material and defining a plurality of resilient adjacent cover segments in contiguous relationship, applying a force on said cover by said first valve component for separating at least two of said adjacent cover segments, removing said applied force to permit said plurality of cover segments to return to said contiguous relationship and for moving said first valve component in a direction relative to said second valve component away from said cover by the resilient return force of said cover, and mounting an elastic band to said cover for exerting an elastic force on said cover in a direction for maintaining said plurality of cover segments in said contiguous relationship.

19. A method of opening and closing a valve device, said method including the steps of:

mounting a first valve component for movement relative to a second valve component, moving said first valve component relative to a cover on a discharge outlet defined in said second valve component, said cover being formed in part from a resilient material and defining a plurality of resilient adjacent cover segments in contiguous relationship, defining an opening in a forward end of said first valve component closest to said discharge outlet defined in said second valve component, said opening in said first valve component being defined substantially planar with said forward end thereof, applying a force on said cover by said first valve component for separating at least two of said adjacent cover segments, removing said applied force to permit said plurality of cover segments to return to said contiguous relationship and for moving said first valve component in a direction relative to said second valve component away from said cover by the resilient force of said cover, mounting said first valve component to a discharge nozzle of a product container, mounting said second valve component to a receptacle such that said discharge outlet of said second valve component is received within said receptacle, and applying a force to said product container for moving said first valve component to apply a force on said cover over said discharge outlet for separating said plurality of cover segments, substantially all product from said product container flowing through said opening in said first valve component and through said discharge outlet of said second valve component, and into said receptacle.

20. A valve device comprising:

an outer valve component, an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing fore is applied thereto, said valve device being in a closed position when said cover is substantially sealed, said cover being mounted to and extending over at least a portion of an outer surface of said valve component, said inner valve components being selectively movable towards said cover over said discharge outlet of said outer valve component for applying said opposing force thereon to separate said adjacent segments of said cover to open said valve device, and stop means for limiting the maximum relative displacement of said inner valve component to said outer valve component;

said inner valve component including a portion having a width greater than the width of the end of the outer valve component remote from said discharge outlet, said wider portion of said inner valve component cooperating with said end of said outer valve component to provide said stop means for limiting maximum relative displacement of said inner valve component in a direction towards said outer valve component.

21. A valve device comprising:

an outer valve component;

an inner valve component received within said outer valve component for relative movement thereto, said outer valve component defining a discharge outlet at one end thereof, a cover formed, at least in part, from a resilient material mounted over said discharge outlet of said outer valve component, said cover comprising a plurality of separate, adjacent resilient segments, said cover being substantially sealed by the resilient force of said material from which said cover is formed when no opposing force is applied thereto, said valve device being in a closed position when said cover is substantially sealed, said inner valve component being selectively movable towards said cover over said discharge outlet of said outer valve component for applying said opposing force thereon to separate said adjacent segments of said cover to open said valve device, said inner valve component defining a forward end thereof at an end of said inner valve component closest to said discharge outlet of said outer valve component, said inner valve component defining an opening therein substantially planar with said forward end thereof.

* * * * *